United States Patent
Doyle et al.

(10) Patent No.: US 6,915,386 B2
(45) Date of Patent: Jul. 5, 2005

(54) PROCESSING SERVICE LEVEL AGREEMENT (SLA) TERMS IN A CACHING COMPONENT OF A STORAGE SYSTEM

(75) Inventors: Ronald P. Doyle, Raleigh, NC (US); David L. Kaminsky, Chapel Hill, NC (US); David M. Ogle, Cary, NC (US)

(73) Assignee: Internation Business Machines Corporation, Armonk, NY (US)

( * ) Notice: Subject to any disclaimer, the term of this patent is extended or adjusted under 35 U.S.C. 154(b) by 213 days.

(21) Appl. No.: 10/162,844

(22) Filed: Jun. 5, 2002

(65) Prior Publication Data

US 2003/0229759 A1 Dec. 11, 2003

(51) Int. Cl.[7] .............................................. G06F 12/00
(52) U.S. Cl. ...................... 711/133; 711/134; 370/351
(58) Field of Search ................................ 711/133, 134; 370/351

(56) References Cited

U.S. PATENT DOCUMENTS

| | | | | |
|---|---|---|---|---|
| 5,737,752 A | * | 4/1998 | Hilditch | 711/133 |
| 6,223,256 B1 | * | 4/2001 | Gaither | 711/134 |
| 6,272,598 B1 | * | 8/2001 | Arlitt et al. | 711/133 |
| 6,778,525 B1 | * | 8/2004 | Baum et al. | 370/351 |

OTHER PUBLICATIONS

High–Tech Dictionary Definition, http://www.computer-user.com/resources/dictionary/definition.html?lookup=8364.*

D. Sacks, *Demystifying Storage Networking, DAS, SAN, NAS, NAS Gateways, Fibre Channel, and iSCSI, IBM Storage Networking*, (Jun. 2001).

* cited by examiner

Primary Examiner—Mano Padmanabhan
Assistant Examiner—Thang H Ho
(74) Attorney, Agent, or Firm—Jeanine Ray-Yarletts; Steven M. Greenberg; Christopher & Greenberg, P.A.

(57) ABSTRACT

A method and system for processing Service Level Agreement (SLA) terms in a caching component in a storage system. The method can include monitoring cache performance for groups of data in the cache, each the group having a corresponding SLA. Overfunded SLAs can be identified according to the monitored cache performance. In consequence, an entry can be evicted from among one of the groups which correspond to an identified one of the overfunded SLAs. In one aspect of the present invention, the most overfunded SLA can be identified, and an entry can be evicted from among the group which corresponds to the most overfunded SLA.

14 Claims, 2 Drawing Sheets

PROCESSING SERVICE LEVEL AGREEMENT (SLA) TERMS IN A CACHING COMPONENT OF A STORAGE SYSTEM

BACKGROUND OF THE INVENTION

1. Statement of the Technical Field

The present invention relates to storage system caching and more particularly to the management of cached data in a storage system.

2. Description of the Related Art

The vast majority of network devices process device requests indiscriminately. That is, regardless of the identity of the requester or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requesters receive different levels of treatment depending upon administratively defined policies. In that regard, a service level agreement (SLA) can specify a guaranteed level of responsiveness associated with particular content or services irrespective of any particular requester. By comparison, quality of service (QoS) terms specify a guaranteed level of responsiveness minimally owed to particular requestors.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different security and service levels have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

As device requests flow through the network and ultimately, to a file system, storage systems provide the terminal point of data access. More particularly, in response to any data request originating in a network, a file storage device such as re-writable media ultimately physically retrieves the requested data. Accordingly, data caching components at all levels of the network, and particularly within storage systems, replicate data that ultimately can be physically retrieved from fixed storage. Like other elements of the network, however, in high request volume circumstances, response times attributable to fixed storage access can add considerable costs to the overall response time.

Presently, the policy differentiation model has been applied to higher-level intermediate network components, such as application servers, in order to provide varying levels of service to particular requestors. The policy differentiation model, however, heretofore has not been applied to lower-level terminal network components such as fixed storage. Primarily, the policy differentiation model has not been applied to terminal network components due both to the inability for fixed storage devices to provide selectably varying levels of service, and also to the inability of fixed storage to access the terms of a service policy. Thus, though the remaining contact points of the enterprise can provide differentiated service, storage systems provide uniform service to all requesters.

SUMMARY OF THE INVENTION

In accordance with the present invention, a discriminatory storage system can include re-writable media; a storage system controller; a cache; and, an SLA enforcement processor configured to selectively evict entries in the cache according to SLA terms propagated into the storage system through the storage system controller. The storage system can further include a cache performance auditing component coupled to the cache. The auditing component can monitor cache performance for groups of data stored in the cache which are associated with particular SLAs. In consequence, the SLA enforcement processor can identify individual ones of the particular SLAs which are overfunded and can selectively evict entries from among the identified groups of data associated with the overfunded SLAs.

In addition to the discriminatory storage system of the present invention, a cache eviction method can be provided. The method can include monitoring cache performance for groups of data in the cache, each group having a corresponding SLA. Overfunded SLAs can be identified according to the monitored cache performance. In consequence, an entry can be evicted from among one of the groups which correspond to an identified one of the overfunded SLAs. In one aspect of the present invention, the most overfunded SLA can be identified, and an entry can be evicted from among the group which corresponds to the most overfunded SLA.

The eviction process of the present invention can be performed in response to an attempt to store a proposed entry in the cache once the cache has become nearly full or full. In the case where the identified overfunded SLA is associated with data other than the proposed entry, the foregoing eviction process can be performed. If, however, an SLA associated with the proposed cache entry itself is determined to be overfunded, an entry associated with the associated SLA can be evicted. In either case, however, the evicting step can include evicting the entry according to a cache replacement methodology selected from the group consisting of least recently used, first-in first-out, last-in first out, and least frequently used.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for processing the terms of an SLA in a caching component of a storage system. In accordance with the present invention, SLA information specifying the terms of an SLA for a particular owner of data can be propagated from the data communications network to the storage system. In particular, the SLA information can be included as part of a request to retrieve the data from the storage system. Upon receipt, the storage system both can retrieve the requested data and also the storage system can manage associated caching components using the SLA terms as a criteria for performing cache eviction. In this way, the caching components of the storage system can be optimized so as to satisfy the guaranteed level of responsiveness specified by the terms of the SLA for the requestor.

Figure 1:
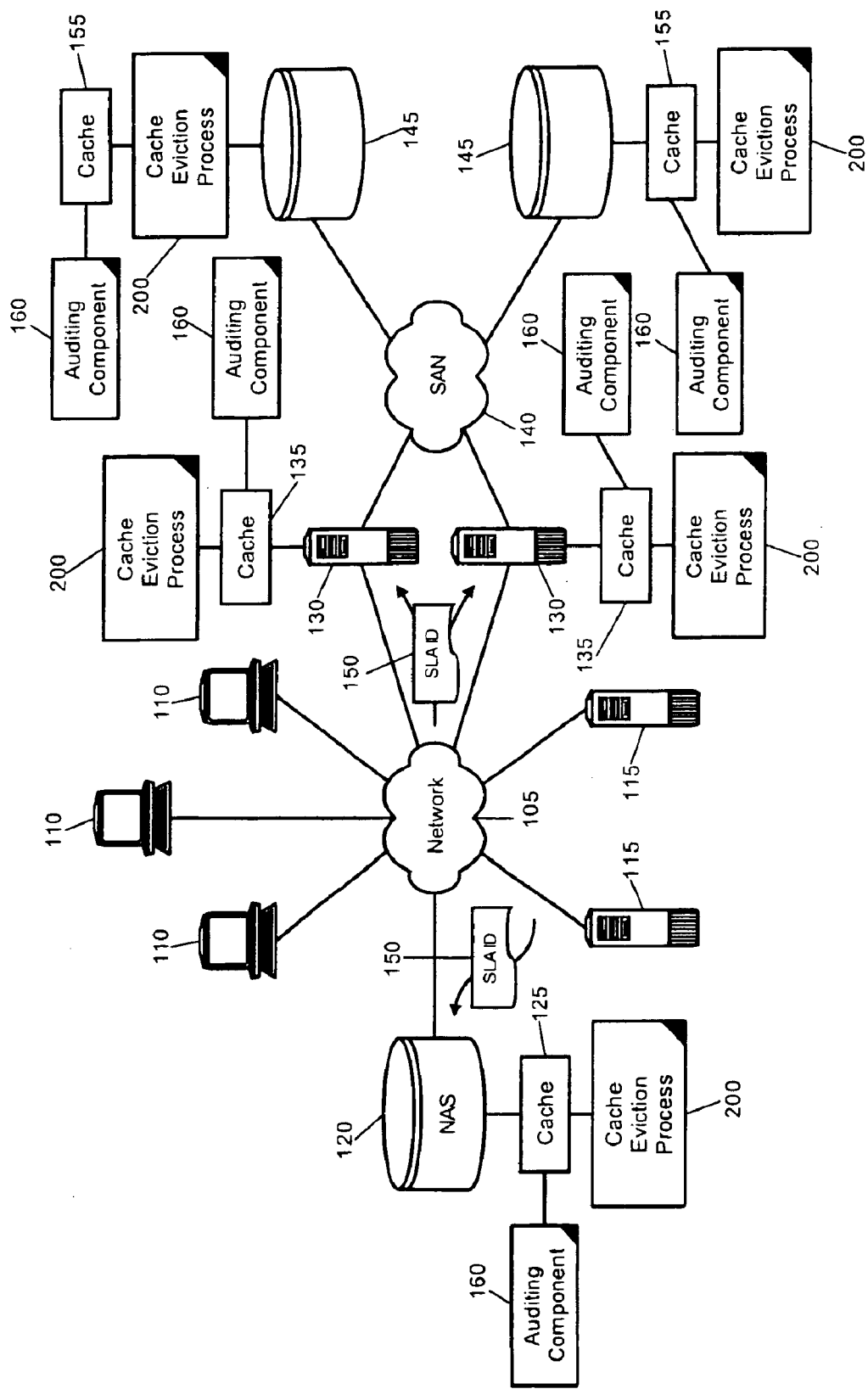
FIG. 1 is a schematic illustration of a data communications network employing both network attached storage (NAS) and a storage area network (SAN) to which QoS data can be propagated in order to enforce SLA terms in the NAS and SAN; and, FIG. 2 is a flow chart illustrating a process for enforcing SLA terms in a caching component of a storage system, such as the NAS and SAN of FIG. 1.

Though the cache eviction policies of the present invention can be applied to the caching components of any particular storage system, including direct attached storage (DAS), in accordance with the present invention, the SLA oriented caching policies can be applied to the caching components of a NAS or a SAN. In that regard, FIG. 1 is a schematic illustration of an exemplary data communications network employing both a NAS and a SAN to which SLA data can be propagated in order to enforce SLA terms in the NAS and SAN. The data communications network 105 can include both a multitude of client computing devices 110 communicatively linked to server computing devices 115.

In operation, client 110 requests for data can be forwarded to the servers 115. The servers 115 can respond to individual requests from the clients 110 in part by retrieving the requested data from a storage system. In the exemplary configuration, the storage system can include a SAN 150 having associated therewith one or more controlling SAN servers 130 and associated storage devices 145, each server 130 and storage device 145 potentially having a corresponding cache 135, 155. According to the exemplary configuration, the storage system alternatively can include a NAS 120 having a corresponding cache 125. Of course, as one skilled in the art will recognize, the invention is not limited to any particular arrangement of NAS and SAN components. In fact, DAS can be provided in lieu of or in combination with the NAS 120 and SAN 140 systems of FIG. 1. Thus, any arrangement of storage systems can suffice so long as the requested content can be retrieved from at least one storage system.

Data can be stored in the storage system, whether the storage system includes a DAS, NAS, or SAN architecture, according to the identity of the provider of the data. More particularly, in accordance with the inventive arrangements, SLA terms which differentiate among different types of data can provide guidelines for caching data in the storage systems, for instance the NAS 120 or the SAN 140. To facilitate the identification of the requestor, an associated SLA indicator 150 can be included with the request for data. For instance, the SLA indicator 150 can be included as an additional parameter within the standard request stream according to the file serving protocol of the NAS 120 or the SAN 140.

Responsive to receiving requests to retrieve data from storage, controlling components in each storage system 120, 140, such as a storage system processor or RAID controller, can cause the retrieval of the requested data from their respective caches 125, 135, 155 where available. When the requested data cannot be located in a corresponding cache 125, 135, 155, the controlling component can retrieve the requested data directly from re-writable media. In that case, once retrieved the data can be stored in the cache 125, 135, 155 as a new cache entry along with the SLA indicator 150.

Importantly, though illustrated in a simplified manner in FIG. 1, the skilled artisan will recognize that caching components 125, 135 and 155 need not be directly linked to any one particular storage component in the storage system 120, 140. Rather, it will be understood that storage systems such as the NAS 120 and the SAN 140 can include a multitude of nested or parallel storage components and corresponding caching components. In consequence, it is expected that the SLA indicator 150 can be propagated throughout the storage systems 120, 140 to the extent necessary to enforce the SLA terms within corresponding caching components as desired by the configurator of the respective storage systems 120, 140.

Returning now to FIG. 1, as is well known in the art, where a cache has been completely, or nearly completely populated with data, stale cache entries ordinarily are removed according to the proven cache eviction techniques in an effort to make room for new cache entries. Conventional cache eviction techniques include least recently used (LRU), least frequently used (LFU), first-in first-out (FIFO), last-in first-out (LIFO), and the like. In the present invention, however, cache entries are removed according to a modified cache eviction process 200 which removes cache entries not only according to conventional cache eviction rules, but also in consideration of the priority of the owner of the cached data in relation to the SLA identifier associated with the cached data.

Specifically, as each cached entry can be associated with a particular SLA, "overfunded" SLAs can be identified. More particularly, for a given SLA, where the cache 125, 135, 155 contains more entries associated with the SLA than would otherwise be required to meet the guaranteed level of storage system 120, 140 responsiveness according to the terms of the SLA, the SLA can be considered "overfunded". To measure the responsiveness of the storage system 120, 140, an audit component 160 can be communicatively linked to the storage system 120, 140. Using the metrics produced by the audit component 160, overfunded SLAs can be identified and a cache entry associated with the most overfunded SLA can be evicted from the cache 125, 135, 155.

Figure 2:
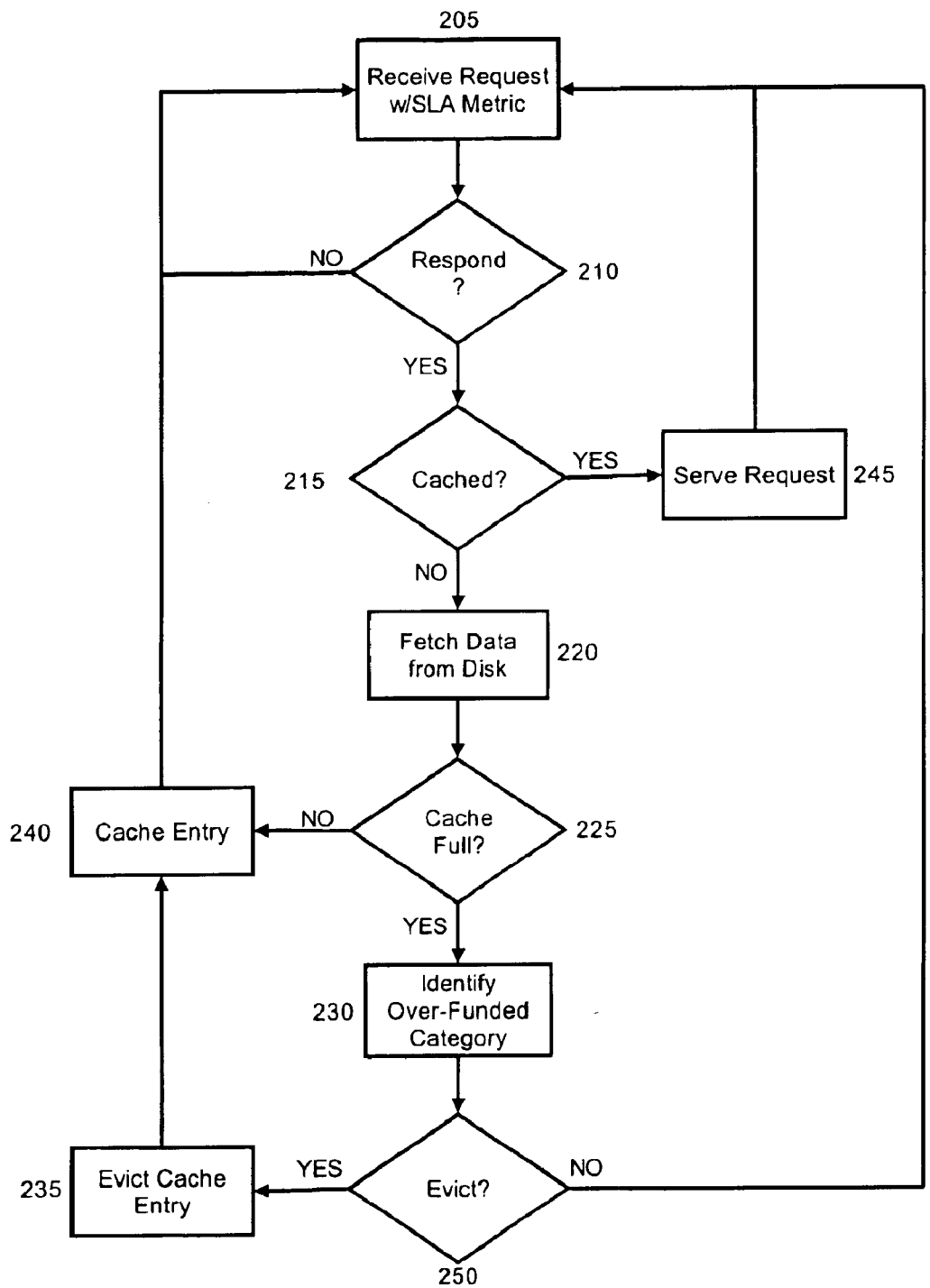

FIG. 2 is a flow chart illustrating a process for enforcing SLA terms during a cache eviction process in a caching component of a storage system, such as the NAS and SAN of FIG. 1. Beginning in block 205, a request can be received in the storage system to retrieve data stored therein. In this regard, the request can be received either in a storage controller directly associated with the storage media as would be the case with a NAS or DAS, or in a storage controller remotely associated with the storage media, as would be the case with a SAN. Of course, in each case of the DAS, NAS and SAN, multiple storage controllers can provide caching and, in consequence, the request can be propagated to selected storage components in the DAS, NAS and SAN.

Notably, the request can include an SLA identifier identifying the owner, or indicating a service level priority associated with a class of owners to which the requested data belongs. For example, the SLA identifier can include an integer number reflecting the identity of the owner, or the class of owner. Of course, it will be understood that the invention is not strictly limited to the nature of the SLA identifier so long as the SLA identifier can be used to determine the guaranteed level of service owed to the owner based upon the terms of a corresponding SLA.

To ensure backwards compatibility with storage systems which do not support the cache eviction policy of the present invention, optionally in decision block 210 the storage system component can ignore the SLA identifier. Otherwise, in decision block 215 it can be determined whether the requested data has been previously cached. If so, in block 245 the data can be served from the cache and no further action will be required. If, in decision block 215, however, the requested data cannot be located in cache memory, the data can be retrieved and served from fixed storage in block 220.

Importantly, as in block 220 the requested data will not have been located in cache memory, the retrieved data can be stored in cache memory in block 240 if, in decision block 225, it is determined that the cache can accommodate the new entry without requiring an eviction of existing data in cache memory. Notably, the SLA identifier associated with the new entry can be added to the cache in association with the new entry. In this way, the responsiveness of the cache can be measured by an auditing component relative to the service level guarantees of those SLAs which correspond to data stored in the cache.

If in decision block 225, however, it is determined that a cache eviction must occur to accommodate the new entry, the cache eviction process of the present invention can perform a cache eviction. Specifically, through consultation with the auditing component, the cache eviction process can determine the performance of the cache relative to select groups of data associated with corresponding SLAs. To select particular data in the cache for eviction, in block 230 the most overfunded group of data associated with a particular SLA can be identified. Once the most overfunded group of data has been identified, in decision block 250 it can be determined whether to evict an entry associated with the overfunded SLA from the cache, and if so, in block 235 an entry associated with the overfunded SLA can be evicted from the cache according to the selected conventional cache eviction methodology. Where no overfunded SLAs can be identified, data associated with the same SLA as the new entry can be subject to eviction. Alternatively, where the SLA associated with the new entry has been overfunded, the new entry need not be cached.

In consequence of the cache replacement logic of the present invention, storage system components and, indeed, entire storage systems, can provide the advantages of differentiated service which, heretofore, had not been applied at the storage system level. Thus, SLA terms which can be enforced at the higher, network level, now too can be enforced at the lowest levels of the enterprise. The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A storage system comprising:
   re-writable media;
   a storage system controller;
   a cache; and,
   a Service Level Agreement (SLA) enforcement processor configured to selectively evict entries in said cache according to SLA terms propagated into the storage system through said storage system controller, said SLA specifying a guaranteed level of responsiveness associated with one of particular content and services irrespective of any particular requestor.

2. The storage system of claim 1, further comprising a cache performance auditing component coupled to said cache, said auditing component having a configuration for monitoring cache performance for groups of data stored in said cache which are associated with particular SLAs, wherein said SLA enforcement processor is further configured to identify individual ones of said particular SLAs which are overfunded and to selectively evict entries from among said identified groups of data associated with said overfunded SLAs.

3. In a storage system, a cache eviction method comprising the steps of:
   monitoring cache performance for groups of data in said cache, each said group having a corresponding Service Level Agreement (SLA), said SLA specifying a guaranteed level of responsiveness associated with one of particular content and services irrespective of any particular requestor;
   identifying overfunded SLAs according to said monitored cache performance; and,
   evicting an entry from among one of said groups which correspond to an identified one of said overfunded SLAs.

4. The method of claim 3, wherein said evicting step comprises the steps of:
   identifying a most overfunded SLA; and,
   evicting an entry from said most overfunded SLA.

5. The method of claim 3, further comprising the step of:
   if an SLA associated with a proposed cache entry is determined to be overfunded, evicting an entry associated with said associated SLA.

6. The method of claim 3, further comprising the step of:
   adding a proposed entry to said cache along with a corresponding SLA identifier which associates said proposed entry with a particular one of said groups of data in said cache.

7. The method of claim 3, wherein said evicting step further comprises evicting said entry according to a cache replacement methodology selected from the group consisting of least recently used, first-in first-out, last-in first out, and least frequently used.

8. A method for processing Service Level Agreement (SLA) terms in a caching component of a storage system, the SLA terms specifying a guaranteed level of responsiveness associated with one of particular content and services irrespective of any particular requestor said method comprising the steps of:

(A) propagating an SLA identifier into the storage system in conjunction with a request to retrieve data from the storage system;

(B) locating said data in the caching component of the storage system;

(C) if said data can be located, retrieving said data from said caching component; and, (D) if said data cannot be located:
   (1) retrieving said data from fixed storage in the storage system,
   (2) determining whether the caching component can accommodate a new cache entry,
   (3) if the caching component cannot accommodate a new cache entry:
      (a) selecting an existing cache entry from among a group of cache entries associated with an overfunded SLA, and,
      (b) evicting said selected cache entry,
   (4) caching said data retrieved from fixed storage in said caching component along with said propagated SLA identifier.

9. A machine readable storage having stored thereon a computer program for performing cache eviction in a storage system, said computer program comprising a routine set of instructions for causing the machine to perform the steps of:

monitoring cache performance for groups of data in said cache, each said group having a corresponding Service Level Agreement (SLA), said SLA specifying a guaranteed level of responsiveness associated with one of particular content and services irrespective of any particular requestor;

identifying overfunded SLAs according to said monitored cache performance; and, evicting an entry from among one of said groups which correspond to an identified one of said overfunded SLAs.

10. The machine readable storage of claim 9, wherein said evicting step comprises the steps of:

identifying a most overfunded SLA; and, evicting an entry from said most overfunded SLA.

11. The machine readable storage of claim 9, further comprising the step of:

if an SLA associated with a proposed cache entry is determined to be overfunded, evicting an entry associated with said associated SLA.

12. The machine readable storage of claim 9, further comprising the step of:

adding a proposed entry to said cache along with a corresponding SLA identifier which associates said proposed entry with a particular one of said groups of data in said cache.

13. The machine readable storage of claim 9, wherein said evicting step further comprises evicting said entry according to a cache replacement methodology selected from the group consisting of least recently used, first-in first-out, last-in first out, and least frequently used.

14. A machine readable storage having stored thereon a computer program for processing Service Level Agreement (SLA) terms in a caching component in a storage system, the SLA specifying a guaranteed level of responsiveness associated with one of particular content and services irrespective of any particular requestor, said computer program comprising a routine set of instructions for causing the machine to perform the steps of:

(A) propagating an SLA identifier into the storage system in conjunction with a request to retrieve data from the storage system;

(B) locating said data in the caching component of the storage system;

(C) if said data can be located, retrieving said data from said caching component; and, (D) if said data cannot be located:
   (1) retrieving said data from fixed storage in the storage system,
   (2) determining whether the caching component can accommodate a new cache entry,
   (3) if the caching component cannot accommodate a new cache entry:
      (a) selecting an existing cache entry from among a group of cache entries associated with an overfunded SLA, and,
      (b) evicting said selected cache entry,
   (4) caching said data retrieved from fixed storage in said caching component along with said propagated SLA identifier.

* * * * *